United States Patent [19]

Stephens et al.

[11] 4,313,168
[45] Jan. 26, 1982

[54] FLUID REGISTER SYSTEM

[75] Inventors: Walter R. Stephens, Islington; Patricio Berstein, Thornhill, both of Canada

[73] Assignee: Exxon Research & Engineering Co., Florham Park, N.J.

[21] Appl. No.: 128,647

[22] Filed: Mar. 10, 1980

[51] Int. Cl.³ .................... B67D 5/00; G06F 15/24
[52] U.S. Cl. .................... 364/465; 364/510; 222/30
[58] Field of Search .................... 364/465, 510, 571; 222/30; 235/92 FL

[56] References Cited

U.S. PATENT DOCUMENTS

| | | | |
|---|---|---|---|
| 3,650,303 | 3/1972 | Chambers et al. | 364/465 X |
| 3,765,567 | 10/1973 | Maiocco et al. | 222/30 |
| 3,814,148 | 6/1974 | Wostl | 364/465 X |
| 3,854,038 | 12/1974 | McKinley | 364/571 X |
| 3,858,758 | 1/1975 | May | 364/465 X |
| 3,895,529 | 7/1975 | Moore | 364/571 X |
| 3,905,229 | 9/1975 | Togo et al. | 364/571 X |
| 3,932,730 | 1/1976 | Ambrosio | 364/464 X |
| 3,984,661 | 10/1976 | Mayer et al. | 364/465 X |
| 4,034,193 | 7/1977 | Jackson | 364/465 |
| 4,056,717 | 11/1977 | Cornforth | 364/571 X |
| 4,067,061 | 1/1978 | Juhasz | 364/900 |
| 4,107,777 | 8/1978 | Pearson et al. | 364/465 |
| 4,133,034 | 1/1979 | Etter | 364/464 |
| 4,186,381 | 1/1980 | Fleischer et al. | 364/465 X |
| 4,207,610 | 6/1980 | Gordon | 364/571 X |
| 4,227,246 | 10/1980 | Vaughan et al. | 364/571 |

OTHER PUBLICATIONS

Sam-Projekt A/S, Kundlund Industrivej 5, DK 8653 THEM, Danmark.
Lockheed Model 840 System-Brochure by Lockheed Electronics, Plainfield, New Jersey.
Mid-Com 6500 System, made by Nudwest Computer Register Corp., Hampton, Iowa Brochure.

Primary Examiner—Edward J. Wise
Attorney, Agent, or Firm—Robert S. Salzman

[57] ABSTRACT

A method, system and data network for a fluid register system used for the delivery of fluid commodities to customers at various delivery sites features a portable data capsule containing pricing information; an electrical fluid delivery volume measurement device; and a vehicular mounted calculator for retrieving the pricing data from said data capsule and calculating a billing amount for each fluid delivery with respect to a fluid delivery volume measurement.

9 Claims, 6 Drawing Figures

FLUID REGISTER SYSTEM

FIELD OF THE INVENTION

This invention pertains to a fluid register system for the delivery of fluid commodities, and more particularly to an improved method, system and data network for the delivery of fluid commodities to customers at various delivery sites.

BACKGROUND OF THE INVENTION

In the delivery of fluid commodities such as fuel oils and home heating oils, etc., the present methods and systems for accurately recording deliveries, and for processing the delivery data at the home office are not entirely satisfactory. Much of the truck data gathered from the delivery of fuel oils is in the form of trip tickets and summary reports, which presently require manual handling. This manual handling is time-consuming and expensive.

In recent times, several electronic fluid register systems have appeared in the market place such as the new electronic Lockheed 840 System made by Lockheed Electronics, Plainfield, New Jersey, and the MID-COM 6500 System, made by Midwest Computer Register Corporation, Hampton, Iowa, etc. The essential change in these fluid registers is that the mechanical computation and register functions have been converted to an electronic method and do not reflect any significant expansion of operating capability. Sales information is still produced on printed paper for subsequent manual handling and entry into office located data processing centres.

The present invention seeks to overcome many of the data handling drawbacks of the prior delivery systems, while presenting new and useful improvements to the art of fluid delivery data handling. The subject invention contemplates the use of a new delivery method, fuel sensing and calibration system, and data network for displaying, printing, and permanently recording every fluid commodity transaction for each delivery vehicle, including the loading of bulk quantities of fluid. The invention features a portable data capsule which feeds pricing data to a delivery calculator and which records the billing data for each delivery.

DISCUSSION OF THE PRIOR ART

The present invention briefly comprises a new method wherein on-site deliveries of a fluid commodity are made under the influence of a unique data control network and a novel electronic delivery volume sensing system. The method features, among others, the novel steps of entering and retrieving pricing data from a portable storage medium which is placed in communication with a calculator mounted on a delivery vehicle. The calculator receives electronic signals corresponding to the sensed or measured volume of the delivered commodity, and converts the volume measurement into a billing amount in response to the retrieved pricing information obtained from the portable storage medium. The billing amount for each delivery is recorded in the portable storage medium.

At the end of the delivery run, or on a daily basis, the portable storage medium is removable from communication with the calculator for deposit with a central office computer or other record keeping facility.

A complete print-out of the entire day's transactions including loading and delivery information and data can be obtained from the portable storage medium by requesting the calculator for a compilation or summary report.

In the prior art of meter reading, the use of a portable computer has been suggested for recording customer utility meter data. The portable computer is carried by a company meter reader to the various customer sites. The portable computer is preprogrammed with the customer's previous utility meter reading. A bill may be calculated by subtracting the previous meter reading from a current meter reading keyed into the computer by the company meter reader at the customer site.

The computer may be programmed to print a bill of the utility charges, which bill is left at the customer location. The updated meter reading for each customer is recorded in a portable tape cassette, which is deposited at a central depository at the end of the day.

The above meter reading system is the subject of a U.S. Patent to B. E. Etter, entitled: "METHOD AND MEANS OF ASSIMILATING UTILITY METER DATA", U.S. Pat. No. 4,133,034; issued Jan. 2, 1979. Like the above-described meter reading system of Etter, the present fuel commodity delivery system of the invention features a portable memory for recording the entire daily transactions. Unlike the utility meter system, however, the inventive portable memory contains pricing data and information on each fluid commodity and delivery zone, which information is retrievable and fed into a portable calculator fixedly carried in the cab of each delivery truck.

Unlike the above meter reading system, the fluid commodity delivery system of the invention features a direct sensing of the commodity being dispensed, and a direct control of the dispensed commodity at the delivery site by the calculator being operated by the deliveryman. In addition, the electronic calculator of the invention has the advantage of being fixedly mounted upon or within the delivery vehicle, such that the expensive calculator or computer equipment is less capable of being lost, stolen or tampered with by unauthorized personnel.

In a patent to J. E. Juhasz, entitled: "MONITORING AND RECORDING SYSTEM FOR VEHICLES"; U.S. Pat. No. 4,067,061; issued Jan. 3, 1978, a system is disclosed which monitors the vehicular operation of a heavy duty truck. Such a monitoring system features a portable recording medium that stores data, such as: mileage, fuel consumption, fuel purchased, etc.

Like the Juhasz system, the portable storage medium of the invention can be used to provide a print-out of the day's operating transactions.

Unlike the Juhasz system, however, the recording medium of the invention contains prior pricing information. The recording medium of Juhasz is not intended to record deliveries and is not, therefore, interfaced with a calculator for computing delivery billing amounts.

BRIEF SUMMARY OF THE INVENTION

The invention particularly relates to on-site deliveries of fluid commodities such as petroleum products, fuel oils, home heating oils, gasoline, etc., but is not means to be limited to specific commodities. It is contemplated that the teachings and inventive novelties expressed herein can be equally applied to deliveries for milk, comestibles, chemicals, propane and other liquids and/or gases, etc.

The invention features a portable data capsule comprising a non-volatile memory, which data capsule is fed information, including a general price format corresponding to deliveries of different fluid commodities to several different delivery zones. Price structures are dependent upon delivery zone and in some cases upon quantity discounts. In addition, the data capsule also contains billing codes corresponding to particular unit prices at particular delivery locations.

Each billing code is an address for retrieving a particular unit price stored in the data capsule. The corresponding unit price (dollars per gallon or liter of fluid) associated with each billing code is retrieved from the capsule in order to calculate a billing amount for each delivery.

Each day, a data capsule and billing tickets are provided to each delivery truck operator from a central data station. Each billing ticket specifies the customer to be serviced for that day, the fluids to be delivered to each customer, and the corresponding billing codes. Each delivery truck carries an electronic calculator device which may be a microprocessor. The electronic calculator device will be able to retrieve from each capsule the pricing data corresponding to each customer. The pricing data is obtained by entering the customer's corresponding billing code into the calculator via the calculator's keyboard, which billing code is obtained from the customer's ticket. At the beginning of each day's run, the truck operator will enter information into the calculator concerning any remaining inventory loaded into the truck from a previous day. The operator also will enter information regarding fluids which he currently loads at the depot.

During the delivery run, the operator inserts each customer ticket into a printer associated with the calculator. Next, he enters appropriate customer information into the calculator device including the proper billing code, and makes the fluid delivery. The calculator receives electronic signals from a volume sensing or measuring device, and retrieves a unit price from the data capsule. The calculator uses this information to calculate a billing amount for the delivered fluid commodity. This billing amount is recorded on a customer portion of the customer ticket, which customer portion is left with the customer, and serves as a bill. The billing amount is also recorded on a deliveryman's portion of the customer ticket, and serves as his receipt of the transaction.

During the day's run, additional information concerning loadings are entered into the calculator device.

All the information which is entered into the calculator is recorded in the data capsule memory. At the end of the day's run, the operator can retrieve all the stored data by requesting a compilation print-out from the calculator device. The compilation report will contain a complete summary of all the transactions of the day, including totals of each fluid loaded and delivered and the total dollar amount of the deliveries.

After each day's run, the data capsule and receipts are returned to the central data station for accounting and other purposes.

The method of the invention is generally for obtaining data relating to fluid commodity deliveries. The method comprises the steps of entering pricing data into a portable storage medium and placing the storage medium into communication with a calculator device. A volume amount is obtained for the delivery to each fluid commodity to each customer at a delivery site. The volume amounts are each fed to the calculator device, and the pricing data corresponding to each particular delivery is retrieved from the storage medium. From this data and information, a bill amount for each delivery is calculated.

The fluid commodity delivery system of this invention is generally comprised of a fluid flow sensor for providing a number of electrical signals in response to a fluid flow of the commodity being delivered, and a converting and calibrating means. The converting means communicates with the flow sensor and converts the received signals to a visual representation of the delivered fluid commodity volume. The calibration means electrically communicates between the fluid flow sensor and the converter means and stores and supplies calibration coefficients for adjusting the visual representation to reflect a true delivered volume of the fluid commodity.

The invention also generally features a data network for accounting for the fluid deliveries. The data network comprises a portable memory capsule; a first data station for entering and retrieving data and information from the portable memory capsule; and a second portable data station being movably carried to each delivery site by the delivery vehicle. The portable data station enters and retrieves data and information from the portable memory capsule.

It is an object of this invention to provide an improved method, system, and data network for the delivery of fluid commodities;

It is another object of the invention to provide a fluid commodity delivery method, system, and data network utilizing a unique portable memory capsule containing a pricing format including unit prices for different commodities delivered to different zones;

It is a further object of this invention to provide a delivery system having a novel means for calibrating and measuring fluid volumes of delivered commodities to various customer sites;

It is still a further object of the invention to provide a new method, system and data network for the delivery of fluid commodities which is more reliable and which improves the processing and handling of fluid delivery data.

These and other objects of this invention will become more apparent and will be better understood with reference to the following detailed description taken in conjunction with the accompanying drawings.

BRIEF DESCRIPTION OF THE DRAWINGS

FIG. 2 is a schematic view of a calibrating mechanism communicating with the calculator device shown in FIG. 1a;

FIG. 4 is a plan view of the keyboard and display for the calculator device of FIG. 1a.

DETAILED DESCRIPTION OF THE INVENTION

The invention is for a method, system and data network for the delivery of fluid commodities to customers located at various delivery sites. The method, system and data network utilize a unique data capture capsule, which contains a prerecorded pricing format for computing a billing amount for each fluid delivery. The data capsule is a portable memory storage unit which is obtained from a cental data station by each delivery operator at the beginning of each day's delivery run. The data capsule supplies the pricing data for each delivery, and also records each delivery transaction, including the loading of bulk amounts of fluid into the delivery truck at a loading depot. At the end of each delivery run or day's transactions, the data capsule provides for the print-out of a summary or compilation report of all the transactions of the day. The capsule is returned to the central data station to update each customer's file contained in a master computer.

Figure 1:
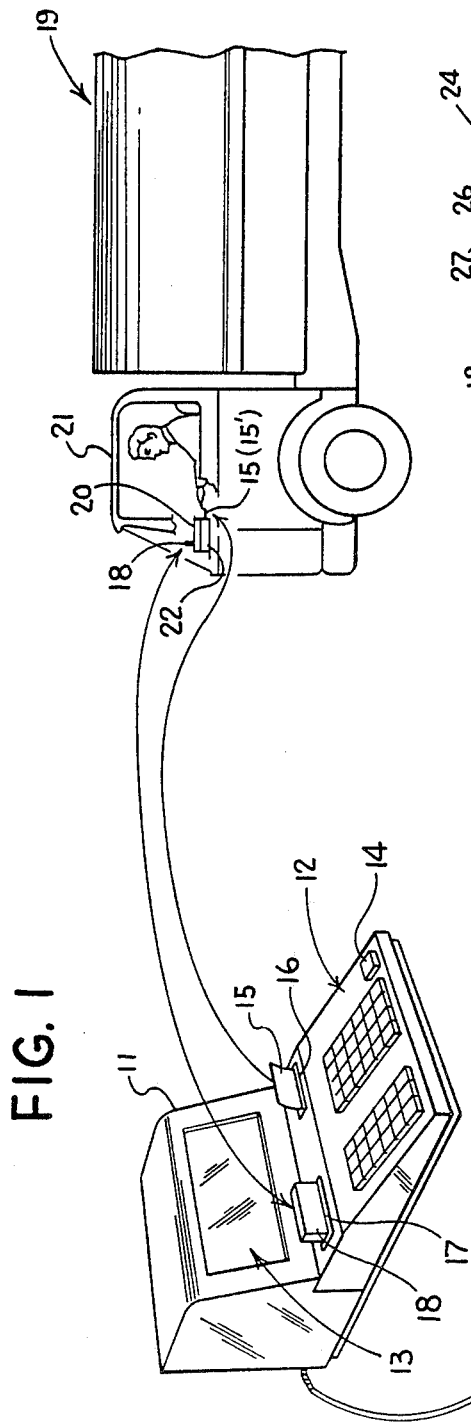
FIG. 1 is a schematic view of the inventive data network for the delivery of fluid commodities.

Now referring to FIG. 1, a data network is generally shown for a fluid commodity delivery system which is particularly applicable to fuel deliveries. The data network comprises a fixed, central data station generally having a main computer 10 which communicates with a data console 11 having a keyboard 12 and a display screen 13. The main computer 10 computes amongst other items of information degree-day data, in order to determine the needs and requirements of fuel oil customers.

Each day, the computer 10 will determine a plurality of customers needing a fuel oil delivery for each delivery route, i.e., each delivery truck will be given information regarding a number of customers who are running low of fuel oil. The main computer 10 is programmed with a customer ticket printing routine, which is invokable through the console 11 by pressing the print button 14. When the button 14 is depressed on console 11, a plurality of customer tickets 15 will be ejected from slot 16 on the console 11. Each customer ticket 15 (typical) will contain amongst other information, the customer's name and address, the type of fuel oil or other petroleum products to be delivered, a billing code, the delivery zone, the tax to be added to the delivery price, etc.

Each customer ticket will be sectioned into three different receipt portions: (a) a customer receipt portion, (b) a truck operator receipt portion, and (c) a data center receipt portion.

The customer receipt portion will be used as a means of billing the customer. This receipt portion will be left with the customer at the delivery site, and will have the delivery and bill amount imprinted thereon at the time of delivery.

The truck operator receipt portion will be used by the truck operator to verify the delivery data when a compilation report is prepared.

The data center receipt will be used by the central office for accounting purposes.

Additional data or information can be added to any individual customer ticket 15 via the keyboard 12 of the console 11, such as a customer address change or a fuel delivery allocation amount in times of shortages.

The console 11 is also provided with a slot 17 for the insertion of a data capsule 18 (typical). A data capsule 18 is provided to each bulk operator and is a portable memory storage unit which is used to record the entire daily transactions of the particular delivery truck.

The typical data capsule 18 can be an encapsulated (modular) non-volatile, semi-conductor, erasable memory with a capacity for 4,096 digits of information in order to accommodate over one hundred delivery transactions.

Each of the data capsules 18 is identical and is programmed with a price format via the computer 10. The price format comprises the unit price (dollars/liter or gallon) of each of several commodities to be delivered, e.g., home heating oil, diesel fuel, gasoline, etc. The particular unit price for each delivery will be subsequently multiplied by the delivered volume in order to calculate a billing amount (in dollars) at each delivery site. Each particular fuel will have more than one unit price depending upon delivery zone or in some cases a quantity discount, i.e., fuels needing to be transported a greater distance will have a higher unit price.

The portable capsule 18 will also contain different tax structures to be applied to each particular delivery when computing the billing amount, since different fuels will be taxed at different rates.

The proper unit price is obtained for each particular delivery or customer by entering into a truck calculator, the zone and a billing code, as will be explained in more detail hereinafter. The proper billing code is obtained from each customer ticket, and when entered into the calculator device will act as a memory locating address.

Figure 1A:
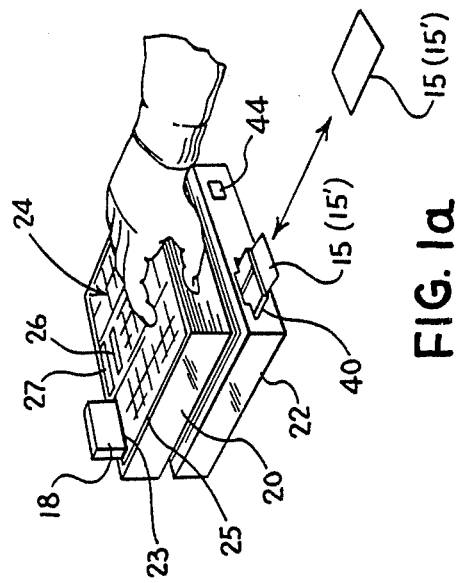
FIG. 1a is a schematic view of the calculator and printing devices used in the inventive data network of FIG. 1.

As part of the data network, each delivery truck vehicle 19 will be provided with a calculator device 20 (also shown in FIG. 1a). The calculator device can be permanently mounted in the cab 21 of the truck 19 for the convenience of the truck operator, and to discourage theft or tampering by unauthorized personnel. The calculator 20 has a peripheral printing device 22 electrically connected thereto, for the purposes of printing a billing amount on each customer ticket, and for printing a compilation report at the end of each day's delivery run.

The calculator device 20 can be a general purpose computer, but is preferably a microprocessor, such as an Intel model 8085 manufactured by the Intel Corporation, Santa Clara, Calif. A sub-function of the processor has 256 words of RAM memory capable of accessing up to 16 I/O sub-systems. The process sub-function has a hardware multiplier which comprises the product of two BCD digits. This is for the purpose of calculating a billing amount for each delivery which requires a multiplication between the unit price obtained from the portable memory capsule 18 and a delivered volume amount. The delivered volume amount can be obtained from an electrical pulse-generating flow meter, as will be explained in more detail hereinafter.

Figure 4:
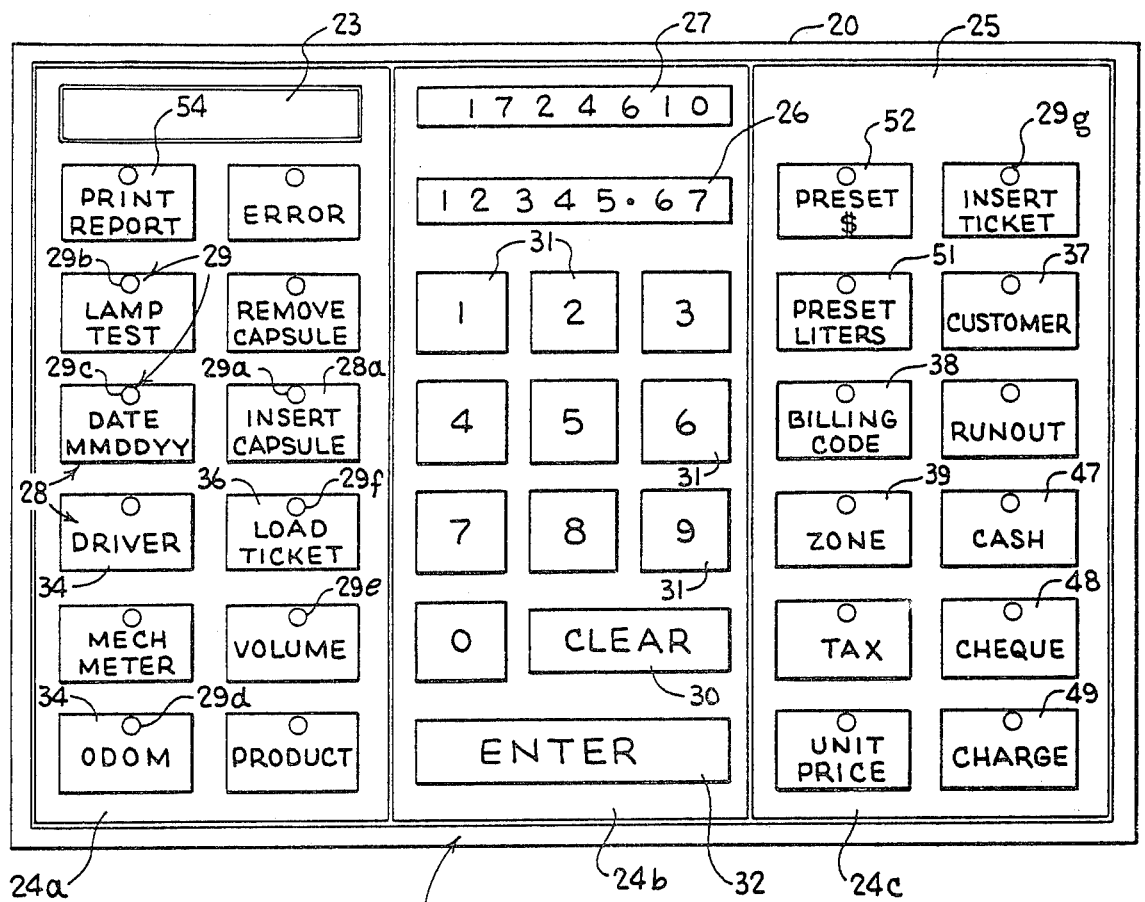

At the beginning of each day, each truck operator will obtain a portable data capsule 18, and a number of customer tickets 15 from the central station, as aforementioned. The truck operator will begin the delivery procedure by inserting the capsule 18 into slot 23, disposed on the upper face panel 25 of the calculator 20, as illustrated in FIGS. 1a and 4. The upper face panel 25 of the calculator 20 comprises a keyboard 24 comprising three sections 24a, 24b, and 24c, respectively, as depicted in detail in FIG. 4. The upper face panel 25 of the calculator 20 also comprises a display window 26, and a totalizer 27, i.e., an electromechanical volume register operating in a continuously ascending register mode.

The activity of the operator at the beginning of the day will relate primarily to initializing the capsule 18 via calculator 20 in order to properly record data for the subsequent fuel deliveries. With the capsule 18 in place (deposited in slot 23 on the panel 25), the calculator 20 is now in communication with the capsule memory. Data and information can be entered into, and retrieved from, the data capsule by depressing the appropriate input key 31 and retrieval key 34, respectively, on the keyboard 24 of the calculator 20, as illustrated in FIG. 1a. The operator will key-in basic information into the capsule 18 such as: the date, his identification number, the odometer reading of his truck, the register amount appearing in the totalizer 27, and any inventory amount of each fluid commodity remaining in his truck from the previous day. Section 24a contains the operation instructions 28 (typical) which are printed on each key 34 used to initialize the capsule 18.

The calculator 20 has a standard-type of routine well known in the art for guiding the operator through the workings of the keyboard operation. Each key 34 has an LED 29 (typical) which illuminates over the instructions 28 printed on the key 34, when information is requested. When the proper response is furnished, the next programmed LED 29 will be illuminated, while the previous LED 29 is extinguished. For example, when the power to the calculator 20 is turned on, the LED 29a for instructions 28a becomes illuminated, indicating that the data capsule 18 is required to be inserted in slot 23. After the proper insertion of the capsule 18, LED 29a is extinguished and LED 29b is illuminated. The operator is now required to enter the date (a numerical entry) via the numerical keys 31 (typical) in section 24b.

When the operator keys in the date, the date will appear in the display window 26. If the operator has made an error in the keying of the date as indicated in the display, he can clear this entry by depressing the clear button 30. If the operator has correctly entered the date, he will then depress the enter button 32. After the entry, button 32 is depressed, LED 29b will go out and LED 29c will illuminate, indicating the requirement for entering the driver identification number via keys 31. When the operator keys-in his identification number, the display 26 will show this entry. If it is correct, the enter button 32 is again depressed, LED 29c will be extinguished, and the "Odometer" LED 29d will become illuminated.

In this fashion, the operator is led through the initializing procedure. If at any time, the operator desires to recall any information, he may depress the appropriate retrieval key 34 on panel 25, and the data will appear in the display window 26. Depressing the clear button 30 will then return the keyboard to the proper place in the routine.

The initialization procedure will be terminated when the "Volume" instruction, LED 29e, is extinguished. This is accomplished by properly entering the previous day's remaining fluid inventories via data input buttons 31.

After initialization of the capsule 18, the operator may load further amounts of fuel(s) at the depot, if his inventories are low. After the operator loads the various products, the load ticket button 36 is depressed and LED 29f is activated. The number of the load ticket is entered into the display 26 via key 31. The enter button 32 is depressed to extinguish LED 29f and illuminate the "Volume" LED 29e.

A product code relating to a particular fluid commodity will now appear in the display 26. If this product is being loaded into the truck, the operator enters the loaded volume via key 31 and presses the enter key 32. Now, the next product code appears in the display window 26, and the procedure is repeated until all the products have been recorded. If a particular product has not been loaded, the enter button 32 is depressed without entering any numerical amount.

When the volume for the last product has been entered, all the lights on panel 25 will be extinguished signifying that the truck is now loaded with products and is ready to make a delivery run.

Any previously entered product volumes will be automatically added to the newly entered product volumes by the calculator 20 to reflect the true inventory values.

At the customer sites, the truck operator must first insert the proper customer ticket 15 into the printer slot 40 and enter the customer code number via key 37. An interlock device located inside the printer 22 will then actuate a flow valve solenoid in the fuel delivery line to an open position. In this regard, the interlock insures that no delivery can be made without a customer ticket being printed for the transaction.

The operator is reminded to insert the customer ticket 15 into slot 40 by LED 29g which will illuminate when the pumping equipment is actuated.

A similar interlock is located in the calculator 20 to insure that fuel cannot be delivered if a data capsule 18 is not positioned in slot 23.

The keys controlling the delivery of products to the customer are generally located in section 24c of panel 25. The appropriate billing code and zone buttons 38 and 39 are respectively depressed and the billing code and zone for that particular customer are respectively entered in sequence into the calculator. As aforementioned, the proper billing code and zone information are obtained from the customer ticket 15. The calculator 20 will directly receive digital volume information from an electronic pulse generating flow sensor 42, generally shown in FIG. 5. The calculator will obtain the volume of the delivered product and multiply it by the unit price fetched from the memory capsule 18.

The calculator 20 will also subtract each delivery amount from the stored inventory volume in order to keep account of the various fuels remaining in the truck.

The totalizer 27, which is nothing more than a continuously ascending register will add each delivery volume to the prior total, thus indicating the total volume of all products delivered-to-date.

After the actual delivery has been achieved, the operator will press a print button 44 located on the front face of the printer 22. This will cause the billing amount to be printed upon the customer ticket 15, and the ticket can then be manually removed or automatically ejected from slot 40. The customer ticket can also be caused to be printed from outside the cab 21 of the truck by means of a remote control switch for the convenience of the delivery man.

Other buttons in section 24c of panel 25 may be actuated as part of the delivery and billing procedure printout. The keying of the "cash", "cheque", or "charge" buttons 47, 48, and 49, respectively, will record the type of payment being made by the customer.

The delivery of a predetermined volume or dollar amount, as in the case of shortage allotments may be entered by keys 51 and 52, respectively. When either one of these buttons is depressed, the calculator will automatically compute the volume (in the case of a present dollar amount) to be delivered, and will automatically control the electrically actuated flow control solenoid (not shown) to shut off the delivery of fuel at the proper time. Again, the delivered volume will be directly digitally fed to the calculator 20 from the flow sensor 42 (FIG. 5).

Figure 5:
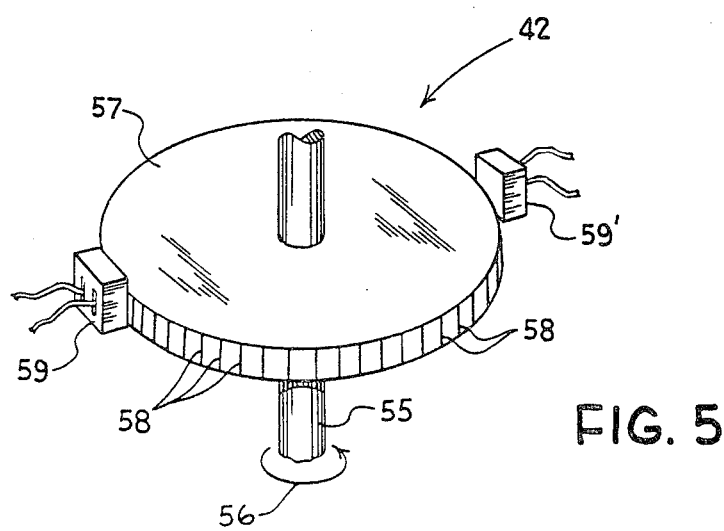
FIG. 5 is a schematic view of a typical flow sensor utilized in the delivery system depicted in FIG. 3.

Referring now to FIG. 5, a schematic view of one type of flow sensor device 42 which can be used in the present system, is illustrated. The flow sensor or measurement device 42 may be a Potter pulse-generating flow meter, manufactured by Potter Instruments Company, or a pulse-generating flow measuring device similar to that shown in the U.S. Patent to J. R. Wiegand, entitled: "PULSE GENERATOR," U.S. Pat. No. 3,780,313; issued Dec. 18, 1973. Pulse-generating flow meters are quite common to the flow meter arts, and many commercial meters are available which are compatible with the present system.

The flow sensor 42 of FIG. 5 is similar to the device described in the aforementioned U.S. Pat. No. 3,780,313, and any description of the pulse-generator of that patent is meant to be included herein by way of reference.

The shaft 55 of the pulse-generating flow sensor 42 is connected to an impeller (not shown) disposed in the delivery flow line. The shaft 55 may also be connected to a mechanical meter flow drive mechanism. In certain jurisdictions, it may be necessary to retain the mechanical meter in order to satisfy certain "weights and measures" requirements. The volume amount may be introduced into calculator 20 directly, as aforementioned, or the volume amount may be read from the mechanical meter and entered into the calculator 20 via the keyboard 24.

Shaft 55 will be caused to be rotated (arrow 56) in response to the fluid flow of the fuel being delivered. The rotor 57 fixedly attached to shaft 55 will rotate through a given rotational angle with respect to the passage of a known volume of fluid in the delivery line. A series of electrical pulses will be generated by the rotor 57 which carries a plurality of evenly-spaced two domain magnetic wires 58 disposed on its periphery. The magnetic wires 58 rotate past two magnetic read heads 59 and 59'. As the wires 58 move past the magnetic read heads 59 and 59', respectively, a first magnetic field in each read head will magnetically switch a first domain in each of the adjacent wires 58. When the wires 58 move adjacent an inductive pick-up coil (not shown) in each head, the second domain in each wire will be caused to be magnetized, thus resulting in an inductive biasing on the first domain. This inductive effect is sensed by the pick-up coil, thus producing a pulse in each magnetic head 59 and 59', respectively.

The system is designed to convert the number of pulses to a volume amount, e.g., 100 pulses per liter of delivered fuel. Two magnetic heads 59 and 59' are used to detect any defects in a particular wire 58. The system will sense in a quarter or half-revolution of the rotor 57 more pulses from one of the magnetic heads in the event one of the wires 58 is defective.

The generated electrical pulses are converted to a volume amount by the calculator 20 through the use of an algorithm based upon the following formula:

$$\Delta V = \frac{CK}{100} + \frac{dv}{dt}(T - 15) \quad (1)$$

where:
T is the Temperature of the fuel in °C.;
C is the calibration coefficient;
K is the Viscosity associated with that particular fuel;
dv/dt is the change in fuel volume per fuel pulse per °C.; and
ΔV is the fuel volume per fuel sensor pulse.
dv/dt is derived from the following formula:

$$\frac{dv}{dt} = \frac{CK}{100}(T_c - 1) \quad (2)$$

where:
T is a temperature correction factor.

In those situations where the temperature correction is not contemplated, the aforementioned formula (1) reduces to $$\Delta V = (CK/100) \quad (3)$$

A temperature sensor in the fuel line (not shown) will provide the value for "T" in equation (1) above.

The temperature sensor can be an Analog Devices AD 590 grade M sensor or equivalent.

Figure 2:
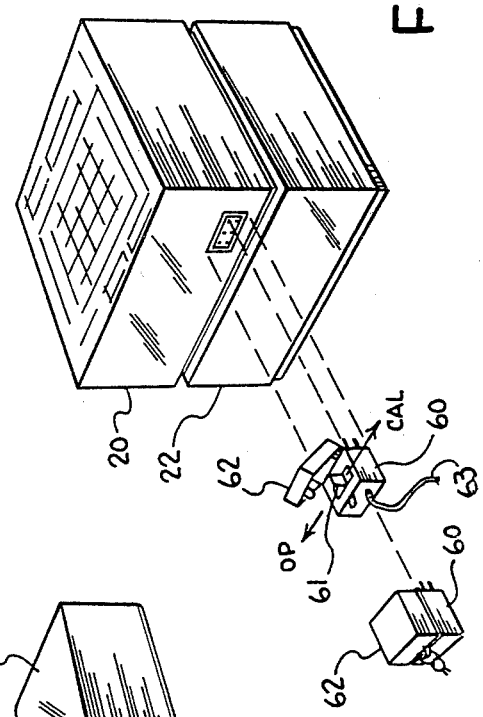

The temperature correction factor for each fuel may be stored in a non-volatile memory disposed in a volume calibrator 60 shown in FIG. 2. The volume calibrator 60 will also contain the calibration coefficient "C" for the fluid flow sensor 42. The non-volatility of calibrator 60 can be achieved by known non-volatile storage means, or by a volatile memory with battery back-up.

The calibrator 60 of FIG. 2 is electrically connected to the calculator 20 by means of a plug and socket arrangement as illustrated. The calibrator 60 is mechanically connected to the flow sensor via cable 63, which cable electrically connects the flow sensor to the calculator through the illustrated calibrator plug and socket arrangement.

The calibrator 60 operates in two modes: an operation mode; and a calibrating mode. A switch 61 protected by a sealable lid 62, can be thrown to either mode position as depicted by the arrows.

In the calibration mode, i.e., switch 61 is in the calibration position, a known volume tank is filled with fuel, and the sensor 42 will supply a number of pulses corresponding to the delivered volume. The calibrator 60 will supply a calibration coefficient to calculator 20. A volume amount will appear in display window 26. If the calibration of the sensor 42 is in need of adjustment, as when the displayed volume does not coincide with the known delivered volume, the correct volume amount is keyed into the keyboard Section 24b. This will cause the calculator 20 to readjust the calibration coefficient, which is then fed into the memory of the calibrator 60. The true volume amount will also appear in display 26. The calibrator switch 61 is then returned to the operation position, and the lid 62 is sealed by authorized personnel. The calculator 20 is now ready for normal operations.

At frequent intervals, the calibration of sensor 42 may be checked to see if the displayed volume amount continues to correspond with a known volume delivered. If it is determined that a correction in the calibration coefficient is again required, the seal is broken, lid 62 is opened, and switch 61 is moved to the calibration position. The aforementioned procedure is then repeated.

The measurement and calibration method used herein can be applied to other measuring systems and devices, and may be briefly summarized as comprising the following steps of:

(a) Electronically measuring a known quantity and providing a first electrical output respective of said known quantity;

(b) determining at least one calibration coefficient for said known quantity in response to said electrical output;

(c) Electronically storing said calibration coefficient;

(d) Electronically measuring an unknown quantity and providing a second electrical output respective of said unknown quantity;

(e) Retrieving said stored calibration coefficient; and (f) Electronically calculating a true quantity for said unknown quantity in accordance with said retrieved calibration coefficient and said second electrical output.

The calibrator 60 is purposely separated from the main calculator housing, so that a breakdown in the calculator 20 will not require a recalibration of sensor 42. If a calculator 20 should be in need of repair, the calculator 20 can be removed from the cab 21 of truck 19, and a new or repaired calculator 20 can be inserted therein without the need to recalibrate sensor 42.

At the end of each delivery run, or on a daily basis, a summary or compilation report may be obtained from the calculator 20 by pressing the print report button 54 in section 24a of the panel 25 (see FIG. 4). The "insert ticket" LED 29g will then illuminate. A compilation ticket 15' will then be inserted by the truck operator into slot 40 of the printer 22 shown in FIG. 1a.

The final odometer reading of the truck may be entered by keying-in the odometer setting in section 24b of panel 25.

When the enter button 32 is depressed, the calculator 20 will cause the printer 22 to print the summary report on ticket 15'.

The entire day's transactions will be summarized, including the print-out of bulk delivery volumes for each product, and bulk dollar amounts for each product.

Memory registers and routines for bulk totalizing are well known in the art, and are easily programmed into an Intel microprocessor, as shown by the U.S. Patent to F. T. Check, Jr. entitled: "MICROCOMPUTERIZED ELECTRONIC POSTAGE METER SYSTEM", U.S. Pat. No. 3,978,457; issued Aug. 31, 1976. Such teachings are desired to be incorporated herein by reference.

After the compilation report is printed upon ticket 15', the ticket 15' is removed or ejected from slot 40 (FIG. 1a), and the portable data capsule 18 is removed from slot 23 on the face panel 25 of the calculator 20.

The truck operator will then return the capsule 18 to the central data station along with the station receipt portions of each customer ticket 15.

The compilation report 15' will also be deposited at the central data station.

Capsule 18, which has captured all the transactions of the delivery run, can now be plugged into slot 17 of console 11 (FIG. 1) to verify the receipts. All the transactions captured in capsule 18 will be displayed on the console display screen 13.

All the information contained in the capsule 18 will also be recorded in computer 10, which will update the master file.

Figure 3:
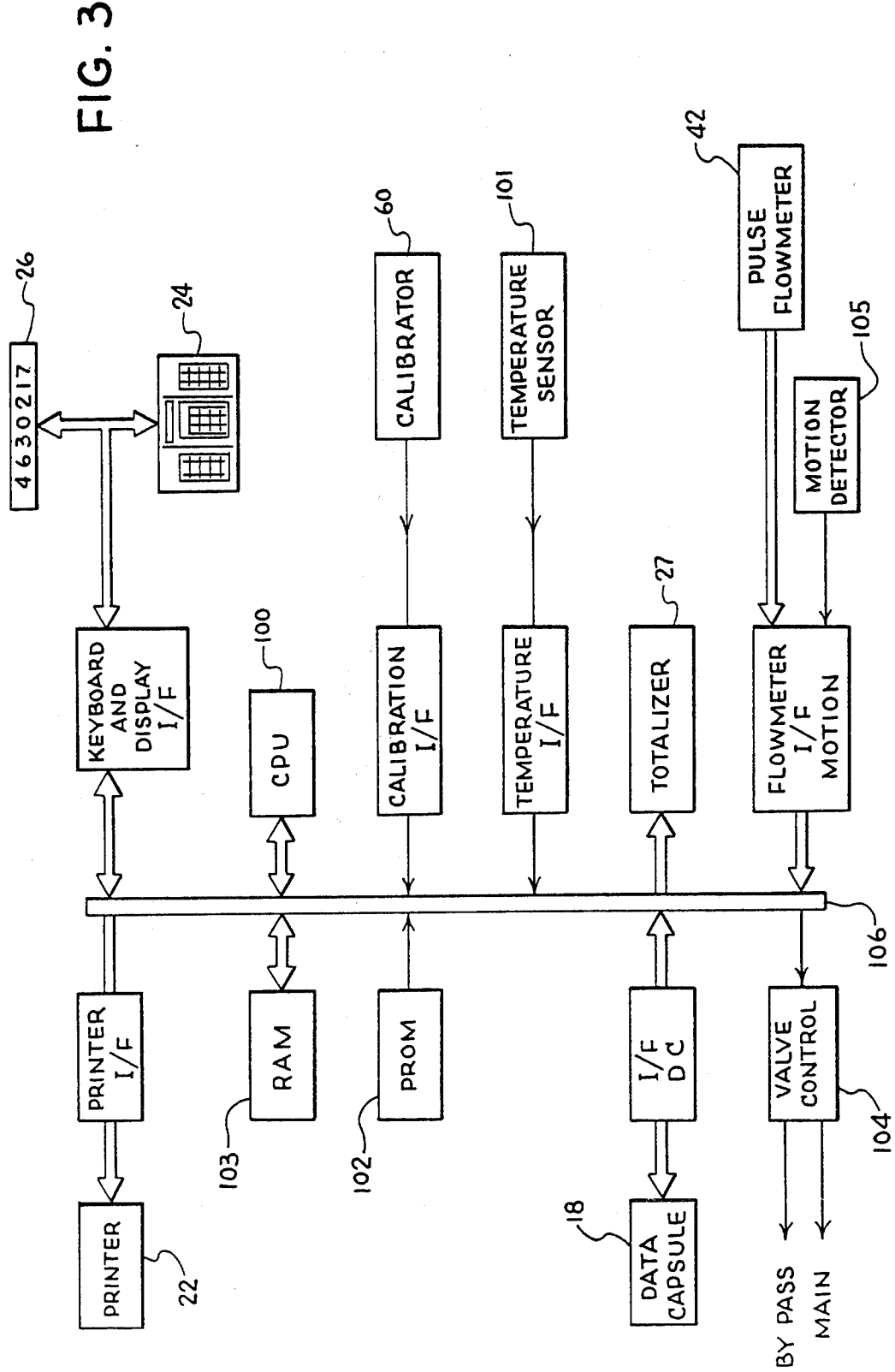
FIG. 3 is a diagrammatic view of the delivery system for the data network illustrated in FIG. 1.

The calculator or microprocessor system for the data network of FIG. 1 is illustrated in FIG. 3. The calculator 20 of FIG. 1 comprises a system employing a central processor unit, 100 for providing data flow control and for providing calculation of the billing amounts for each delivery in accordance with the received information from the data capsule 18, the flowmeter 42, the calibrator 60, and a fuel temperature sensor 101. Coupled to the CPU 100 is a permanent non-alterable memory or PROM 102 which stores the delivery program. A temporary or RAM memory 103 is also provided for storing and forwarding working data in accordance with the operation of the CPU 100.

The use of a non-volatile memory for data capsule 18 is important in that data which is significant in the system, i.e., data regarding each delivery, is permanently stored or captured.

Further interaction is provided with the CPU 100 by means of the keyboard 24, which provides the appropriate data and information to the CPU 100 for data keeping and calculation purposes. The display 26 also interfaces with the CPU 100 for recalling data from the temporary storage 103 in accordance with keyboard commands.

The ultimate output of the CPU 100 is coupled to a customer ticket and compilation report printer 22 for printing the various receipts, bills, and data reports.

Under the influence of the CPU 100, the flow of the fluid commodity can be controlled via the aforementioned valve control device 104 comprising a pair of solenoid actuated valves. One valve can effect a complete shut-off of the flow, as when either of the ticket interlock or capsule interlock is operative. The other valve can cause a slowing of the flow just prior to shut-off. As an added tamper-proof feature, the system may comprise a motion detector 105 and an appropriate interlock, which will automatically cause a customer ticket 15 to be printed and the delivery data to be entered into the capsule 18, if the truck is moved before the customer ticket has been printed. This or other interlocks may also be connected to the power train, braking system or ignition of the delivery vehicle.

All the various peripheral and interfacing components communicate with the CPU 100 via the data bus 106.

It should be understood that the present invention has been presented herein in an exemplary fashion since many modifications and changes can be realized by the skilled practitioner. Various changes can be made in the various data gathering procedures and equipments as befits a particular intended purpose. The invention is intended as a teaching in the best mode of how such a delivery system may operate. The protection sought by way of Letters Patent is intended to be encompassed within the spirit, scope and purview of the following appended claims.

What is claimed is:

1. A method of effecting deliveries of fluid commodities to a number of customers at various, respective delivery sites, comprising the steps of:

(a) entering into a portable storage medium, customer pricing data and infomation relating to fluid commodities to be delivered to a number of select customers, said pricing data and information being unique for each customer, and which can be different for each customer;
(b) placing said portable storage medium into two-way communication with a calculator means to provide for a two-way flow of information and data between said portable storage medium and said calculator means;
(c) entering into said calculator select customer codes;
(d) obtaining a volume amount measurement of at least one fluid commodity being delivered to each given customer at a delivery site;
(e) retrieving from said portable storage medium select pricing data and information corresponding to each respective customer in accordance with said select customer codes;
(f) calculating from said volume amount measurements and said corresponding pricing data and information a bill amount for each delivery to each of said corresponding customers;
(g) printing each calculated bill amount upon a corresponding customer ticket; and
(h) storing each bill amount in said portable storage medium for subsequent retrieval.

2. The method of claim 1, further comprising the step of:
(i) displaying each calculated bill amount.

3. The method of claim 1, wherein said portable storage medium comprises a non-volatile memory capsule and said calculator means comprises a capsule insertion slot, step (b) of the method further comprising the step of:
(i) inserting said capsule into the calculator slot to provide communication between said storage means and said calculator means.

4. The method of claim 1, wherein said calculator means is fixedly mounted upon a fluid commodity delivery vehicle, said method further comprising the steps of:
(i) transporting said calculator means to various delivery sites; and
(j) controlling the delivery of said fluid commodity via said calculator means.

5. The method of claim 1, further comprising the step of:
(j) storing loading information in said portable storage medium.

6. The method of claim 1, further comprising the step of:
(k) printing a compilation report for said loading and billing information.

7. The method of claim 1, further comprising the steps of:
(j) removing said portable storage medium from communication with said calculator means; and
(k) placing said removed portable storage medium in a reader device to obtain stored billing information.

8. The method of claim 7, further comprising the step of:
(l) transferring billing information from said reader device to a central computer.

9. The method of claim 7, further comprising the step of:
(l) displaying a compilation of the billing of a number of deliveries.

* * * * *